May 12, 1942.   J. F. TURKE   2,282,440
ELECTRICAL GLASS SPLITTING MACHINE
Filed Oct. 6, 1938   3 Sheets-Sheet 1
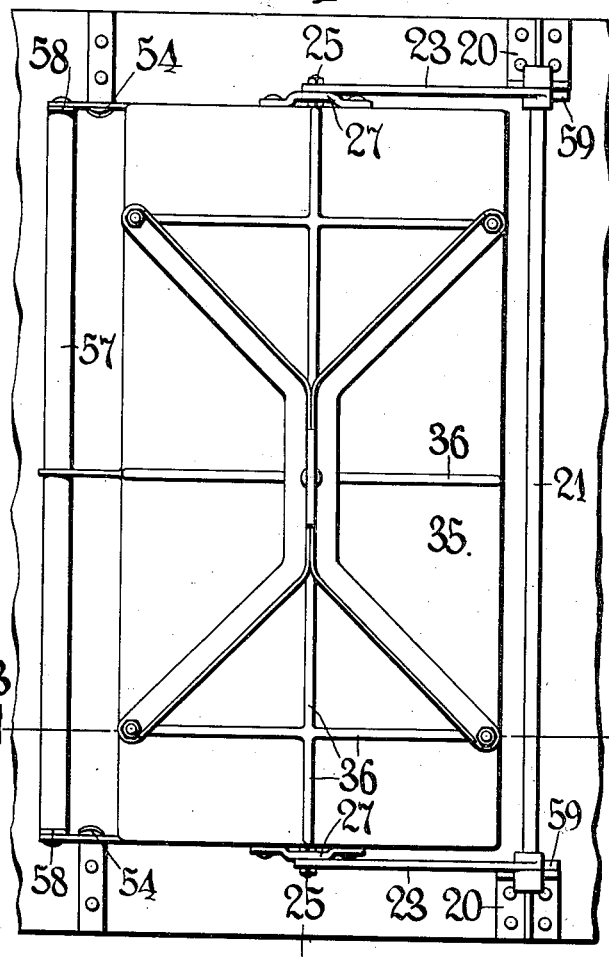
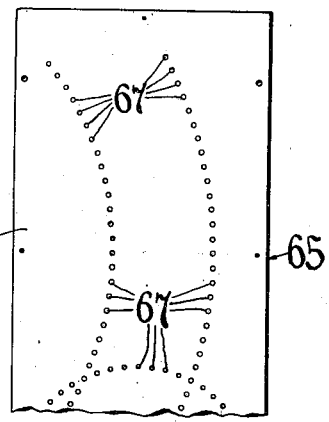
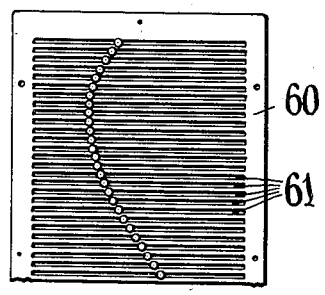
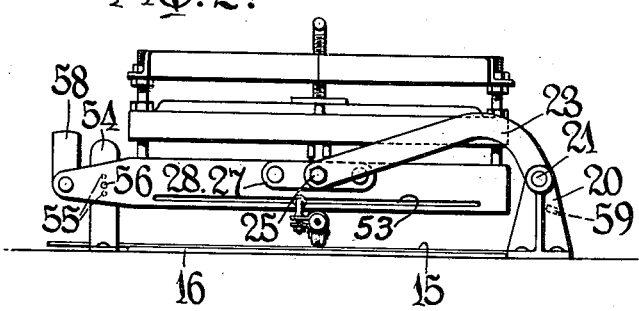
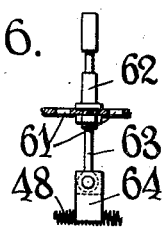
INVENTOR
Joseph F. Turke,
BY
Beau, Brooks, Buckley & Beau.
ATTORNEYS May 12, 1942.  J. F. TURKE  2,282,440
ELECTRICAL GLASS SPLITTING MACHINE
Filed Oct. 6, 1938  3 Sheets-Sheet 2

INVENTOR
Joseph F. Turke,
BY
Beau, Brooks, Buckley & Beau.
ATTORNEYS

May 12, 1942.  J. F. TURKE  2,282,440
ELECTRICAL GLASS SPLITTING MACHINE
Filed Oct. 6, 1938  3 Sheets-Sheet 3
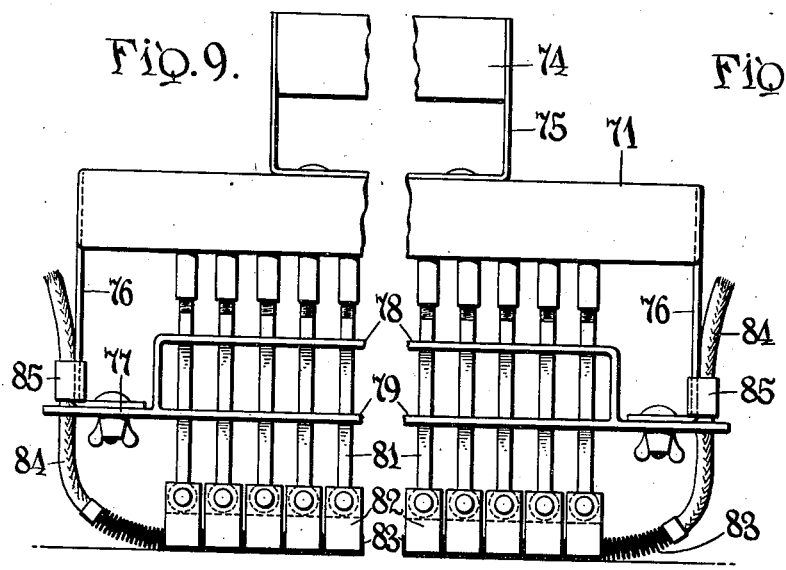
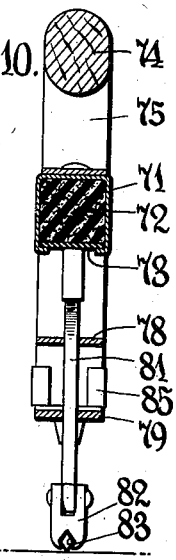
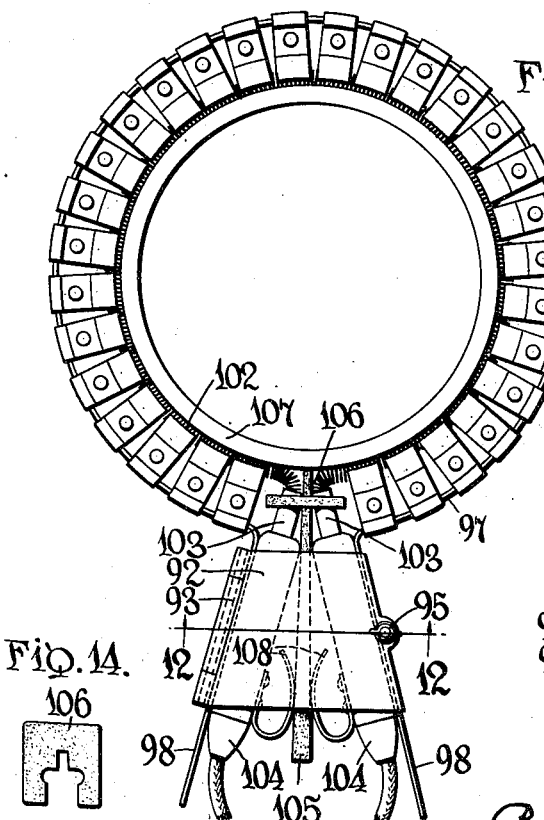
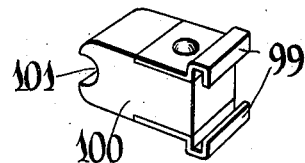
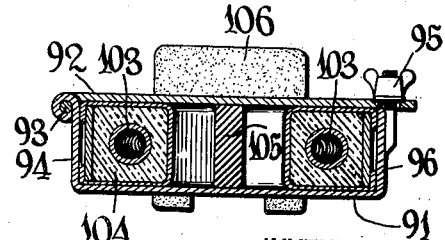
INVENTOR
Joseph F. Turke,
BY
Bean, Brooks, Buckley & Bean.
ATTORNEYS Patented May 12, 1942

2,282,440

UNITED STATES PATENT OFFICE 2,282,440

ELECTRICAL GLASS SPLITTING MACHINE

Joseph F. Turke, Collins, N. Y.

Application October 6, 1938, Serial No. 233,606

4 Claims. (Cl. 49—50)

The present invention relates to apparatus for splitting glass, slate, marble and similar non-inflammable materials, and particularly to improvements in that type of apparatus wherein an electrical heating element may be brought into contact with the surface of such material for effecting severance of it along the line of contact.

The apparatus contemplated preferably includes a perforated and somewhat flexible base for supporting a sheet or plate of the material to be split, the perforated form of the base allowing the circulation of air for cooling the underside of the material, and its flexibility providing for uniform distribution to the base of pressure exerted upon the material. These features increase the accuracy and uniformity of the break or split in the material which is produced when the electrical heating element is brought into contact with the upper surface thereof.

The heating element is supported by a plurality of juxtaposed insulators backed by resilient means so that the heating element will contact the surface of the material to be severed along a continuous line with substantially uniform and equal pressure at all points there-along. An adjustment is provided to compensate for different thicknesses of sheets being split, in order that a uniform light pressure of contact of the heating element may be maintained.

Preferably the assembly supporting the heating element is hinged to the base whereby it may be swung easily to and from an operating position to enable the removal of the severed pieces of material and the insertion of other material to be severed. When out of operating position, the heating element is inverted and disposed above the adjacent parts of the machine, thereby preventing excessive heating of the latter parts.

Further, the invention contemplates means for adjusting the heating element relative to the other parts of the apparatus for splitting sheets upon lines of different angularity and curvature.

These and other objects and advantages, including those relating to modified embodiments of the invention, will become apparent from the following description of the apparatus shown in the accompanying drawings, wherein:

Fig. 1 is a plan view of the preferred form of the apparatus;

Fig. 2 is a side elevation thereof;

Fig. 5 is a fragmentary plan view of a guide adapted for use in the apparatus when severing plates or sheets along curved lines;

Fig. 6 is a fragmentary vertical sectional view taken through certain of the parts shown in Fig. 5;

Fig. 7 is a fragmentary plan view of another guide similar in purpose to that shown in Fig. 5;

Fig. 8 is a side elevation of the part shown in Fig. 7;

Fig. 9 is a side elevational view of a modified form of the invention;

Fig. 10 is a vertical section through the apparatus shown in Fig. 9;

Fig. 11 is a plan view of another form of the invention, and which is adapted for severing bottles and similar cylindrical objects;

Fig. 12 is a vertical sectional view taken along line 12—12 of Fig. 11;

Fig. 13 is a perspective view of one of the heating element insulators shown in Fig. 11; and Fig. 14 is an elevational view of a tensioning member that appears in plan view in Fig. 11.

Figure 4:
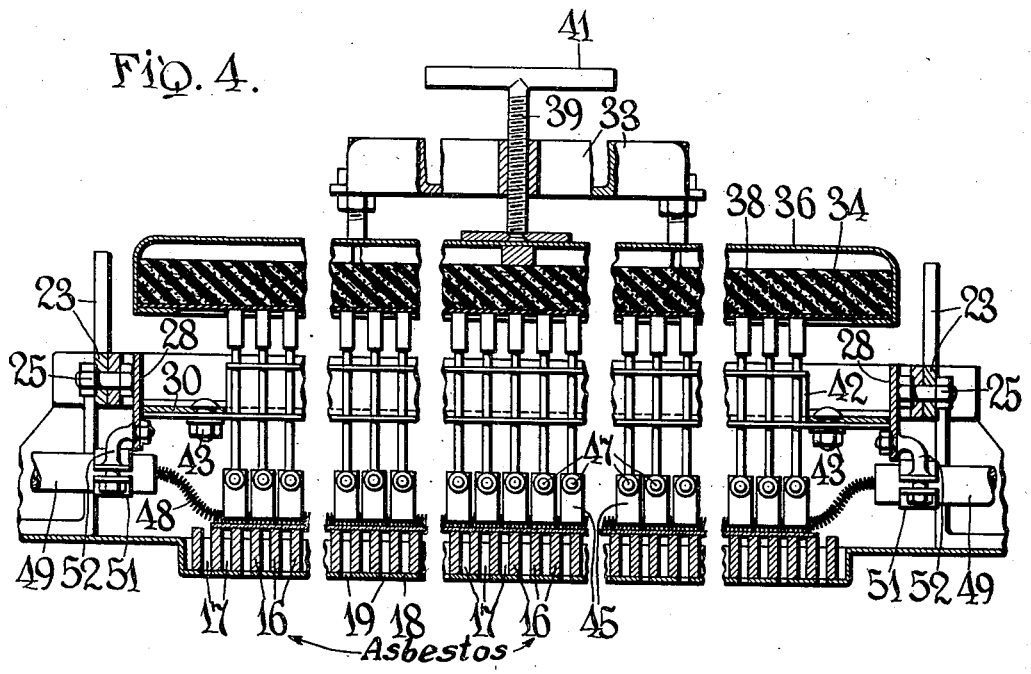
Fig. 4 is a similar vertical section, but taken at right angles to Fig. 3.
Figure 3:
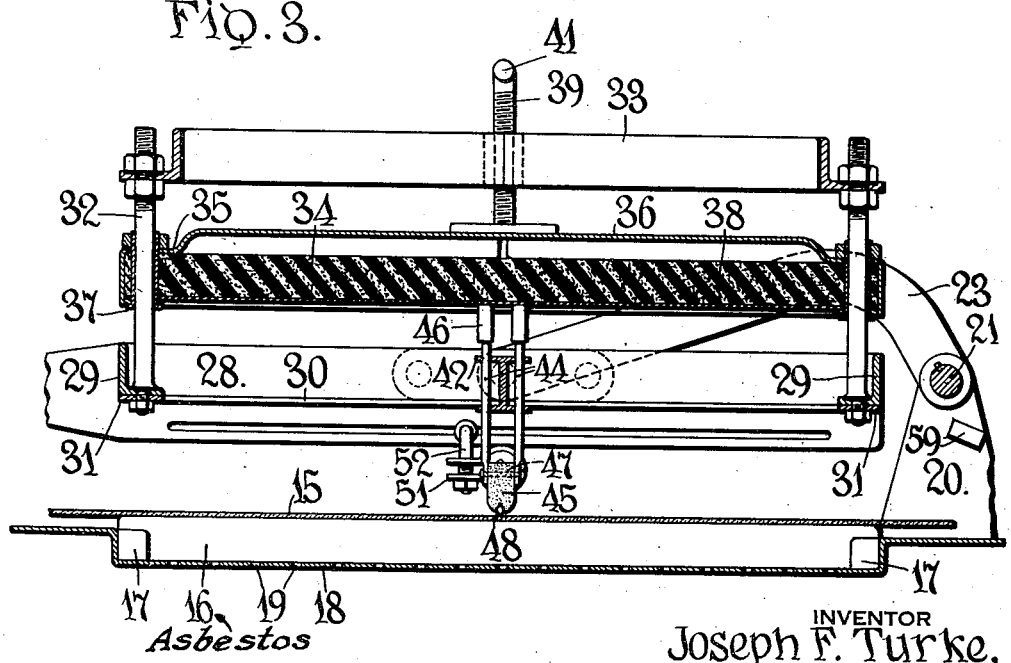
Fig. 3 is a vertical section, on a larger scale than Figs. 1 and 2, taken substantially along line 3—3 of Fig. 1.

As shown in Figs. 1 to 4 inclusive, the apparatus has a base for supporting a sheet 15 of material to be severed, the base comprising a grid of asbestos or similar material, preferably somewhat flexible. The grid consists of bars 16 spaced by members 17, and is mounted upon a metallic plate 18 having perforations 19, whereby air may circulate naturally or may be circulated by force along the bottom surface of the sheet to be severed. Plate 18 may be secured to a suitable supporting framework or table, not shown, as also may be uprights 20 which are located at opposite sides of the machine.

Extending between uprights 20 and journaled for pivotal movement therein is a rod 21. Arms 23 are secured to rod 21 adjacent the ends thereof, the free ends of arms 23 being connected by screw threaded fasteners 25 to brackets 27 that are fastened to rails 28. The latter are welded or otherwise joined to angle bars 29 to form a rectangular support. Secured to parts 28, 29 is a rectangular frame for carrying the electrical heating element. The frame has side rails 30, and front and rear rails 31.

Secured to the angle bars 29 and extending upwardly therefrom are bolts 32, the upper ends of which are connected by a spider 33 which may be formed from angle iron. The bolts 32 act as guides for a resilient pad 34 that may be composed of rubber or similar material, and which is reinforced by a flanged backing plate 35 formed of metal. As shown in Fig. 1 the plate 35 is rigidified by corrugations 36 formed in the surface thereof. Sleeves 37 extending through pad 34 and plate 35 serve to guide the latter upon bolts 32. A flexible sheet 38 of heat-resisting material is preferably extended along the lower surface of the pad.

For adjusting the vertical position of the pad, a screw 39, having a handle 41, is threaded through the center of spider 33 and has its lower end swively connected to plate 35.

A bar 42, which may be of I cross-section, is secured by bolts 43 to rails 30, the latter having slots extending lengthwise thereof for receiving the bolts, whereby the bar 42 may be secured in any of various positions between the two angle bars 29. Bar 42 also has longitudinally extending slots receiving the bolts 43 whereby it may be secured diagonally across frame 30, 31 if desired. Guided in openings through the flanges of bar 42 are stems 44 to whose lower ends are secured insulators 45, and to whose upper ends are secured caps 46 which bear upon the under surface of resilient pad 34.

In the form of the invention illustrated in Figs. 1 to 4 inclusive, each insulator 45 is supported by two of the stems 44, being pivoted thereto by a rivet 47. The electrical heating element 48, carried within recesses formed in the insulators, is preferably a winding of diamond or other angular shape in cross-section so that a narrow edge is presented to the surface of the material to be severed, 15. By having the resistance element of diamond shape in cross-section, and by having corresponding recesses in the insulators, the element is centered within the insulators automatically when pressed onto the surface of a sheet 15. The ends of the heating element 48 are secured to suitable electric leads (not shown) extending to a source of electrical energy and are supported by insulators 49 carried by clamps 51. Angle bolts 52 are employed to adjustably support the clamps, by being secured through slots 53 which extend lengthwise of rails 28.

Secured to the base are upwardly extending spring latches 54, each of which has recesses 55 for receiving a latch pin 56 carried by each side rail 28. Extending between rails 28 and rotatably secured thereto is a handle 57 which at its ends carries fingers 58. By partially rotating the handle, the fingers may engage cam surfaces on the upper ends of spring latches 54 to release pins 56 from the recesses 55 with which they are engaged.

Uprights 20 may carry stops 59 which are abutted by arms 23 when the hinged part of the machine is swung on pivot rod 21 to inoperative position wherein the heating element is substantially inverted.

In operating the machine, the handle 57 is swung after release of the latch mechanism until the frame is supported in inverted position by engagement of arms 23 with stops 59, and the electric current is turned on sufficiently to cause the resistance element 48 to be fully heated and maintained in such condition. A sheet or plate 15 of glass, slate or other material to be severed, is placed in suitable position upon the grid bars 16, and the handle is then lowered until the latch mechanism 54, 55, 56 engages. In this position of the parts the resistance element 48 will be pressed firmly against the surface of material 15 throughout its entire length of contact with the latter.

When the resistance element is properly heated at the time of operation, the material 15 will split along the line of contact within a very short time after contact, probably due to greater expansion of the upper surface than the lower surface which remains relatively cool.

Immediately upon such splitting the latch means may be released, the handle raised and the pieces of sheet 15 removed. Another sheet 15 may then be inserted and the splitting operation repeated.

During the splitting operation the pivotal connections between the insulators 45 and stems 44, and the resilient pad 34 backing the stems, allow the heating element 48 to follow the contour of the surface of the sheet 15, and uniform pressure of the heating element is assured by the resilience of pad 34 and the large number of the insulators 45 which support the element. Likewise the sheet 15 is uniformly supported due to the flexibility of the grid bars 16, so that the pressure exerted upon it is transferred uniformly to the grid bars. These features enable the material 15 when heated along a line on the upper surface thereof to split accurately upon such line.

In order to facilitate splitting, especially where a large number of sheets of the same size are to be cut, suitable stops, not shown, may be placed on the base plate 18 to center or square each sheet as it is placed upon the grid bars 16.

If desired a plurality of heating elements 48, together with the insulators 45, stems 44, and supporting bars 42, may be secured to the frame 30, 31 in order to split the sheets 15 along plural lines, either straight or curved, or parallel or angularly related, at one time.

By turning the screw 39 the pad 34 may be raised or lowered to adjust the pressure of the heating element 48 upon the sheets 14, and also to adjust the machine for handling sheets 15 of different thicknesses. Upon loosening of the screw threaded fasteners 25, the frame 28, 29 may be adjusted relative to arms 23 about the axis of the fasteners to cause the frame to be parallel to the upper glass surface when the heating element is in operative relation thereupon.

When it is desired to cut the material 15 along a curved line or lines, the apparatus shown in Figs. 5 and 6 may replace frame 30, 31 and the parts supported thereby. This apparatus includes a plate 60, adapted to be bolted to parts 28, 29 and having a plurality of parallel slots 61 through each of which a nipple 62 may be secured, as shown in Fig. 6. Guided in each nipple is the stem 63 of an insulator 64 recessed for receiving a portion of the heating element 48. Since the nipples may be secured at any points along the length of the slots 61 by merely loosening the nuts which hold them, they may be arranged to define almost any desired curve, either regular or irregular; and, of course, the heating element 48 associated therewith will assume a corresponding curvature. Accordingly, when the machine is operated the sheet 15 will be split upon a line of the same curvature.

When it is desired to cut a relatively large quantity of sheets or plates 15 along a line or lines of the same curvature, a member 65, shown in Fig. 7, may be substituted for frame 30, 31 and bar 42. The member 65 is adapted to be secured to the parts 28, 29, and comprises spaced upper and lower plates 66 with a plurality of openings 67 defining a curve, or a plurality of series of openings each of which defines a different curve, the openings in both plates 66 being alined.

Through each pair of alined openings of the selected series, for the desired curve, is extended a stem 63, such as shown in Fig. 6, carrying an insulator 64 supporting a portion of a heating element 48.

In Figs. 9 and 10 is illustrated a portable sheet or plate splitting device of simplified construction, but employing some of the features of the device shown in Figs. 1 to 4 inclusive. It includes a backing channel member 71 carrying a resilient pad 72 of rubber or like material, the bottom face of which is covered by a heat resistant flexible sheet 73. The channel member has a handle 74 secured to its back by bracket 75, and depending arms 76 which carry a bar 77 having upper and lower flanges 78 and 79.

Extending through vertically alined openings in the latter are a plurality of stems 81 of noncircular cross-section having cups for bearing against the underside of pad 72, and at their lower ends having insulators 82 for carrying an electrical heating element 83. The ends of the heating element are connected to electric lead wires 84 which extend to a suitable source of electrical energy. Clips 85 engaging arms 76 may serve as supports for the ends of the lead wires.

In using the device the current is turned on and a plate of glass, for example, is placed upon a flat table or bed. The device is held upon the plate with element 83 contacting the surface thereof along the desired line of split, and a slight pressure is exerted on the handle to cause uniform contact. In making a cut longer than the heating element, a straight-edge may be laid along the proposed line of severance, and the splitting device operated to make several successive cuts therealong.

When not being used the device is preferably supported in inverted position so that the heating element will not excessively overheat adjacent parts.

If desired, the bar 42 and parts supported thereby may be removed from the machine shown in Figs. 1 to 4 inclusive and placed in a holder 71, 74, 76 of the kind shown in Figs. 9 and 10. And, if desired, the parts shown in Figs. 5 to 8 inclusive may be used in connection with such a hand holder.

The apparatus shown in Figs. 11 to 14 inclusive is for severing tubes, cylinders, bottles or the like, around the peripheries thereof. It includes a channel member 91 having a cover 92 hinged at 93 to one flange 94 thereof, and secured by a releasable fastener 95 to the other flange 96 thereof.

A resilient band 97 has end portions 98 extended through the channel member 91, and a loop or bight portion engaged by hooks 99 secured to insulators 100. The latter have recesses 101 for receiving an electrical resistance element 102 whose ends are frictionally held in metallic tubes 103 carried by metal sheathed insulators 104 that are disposed within the channel member. To the tubes 103 are secured suitable electric lead wires.

The end portions 98 of the band are frictionally gripped by the metallic sheaths around the insulators. Springs 108 carried by the insulator sheaths are engaged by a wedge 105 of insulating material which serves to hold the outer ends of the members 104 against the flanges 94 and 96. A clamping member 106, also of insulating material, engages the tubes 103 and is slidable upon the wedge 105 to vary the distance between the adjacent ends of the tubes.

To operate the device, the ends 98 of the band are adjusted relative to the insulators until the inner surfaces of the insulators are spaced slightly from the walls of a cylindrical object 107 of given diameter which is to be severed. The bight portion of the heating element then may be caused to firmly engage the walls of cylinder 107 by sliding the clamp 106 outwardly or away from the object to be severed, and after proper adjustment the current may be turned on. When sufficient heat has been developed, the cylinder, of glass or similar material, will split along the line of contact with element 102.

When splitting a plurality of cylinders or bottles of approximately the same diameter, adjustment of the band ends 98 is not necessary, the heating element only being loosened by sliding clamp member 106 away from the channel member 91 thereby further separating the ends of tubes 103.

In splitting laminated or "safety" glass with any of the devices described herein, the resistance element should be removed from the glass as soon as splitting occurs in order to avoid discoloration at the edges. Both layers of the glass will split simultaneously and thereupon the binder between them is easily torn.

I claim:

1. In apparatus for severing glass and similar material, an elongated electrical resistance element for engagement with a surface of the material to be severed, a plurality of insulator units supporting said electrical resistance element along its length, a pressure member for exerting pressure on said insulator units and spaced therefrom, and a pad of resilient material between the insulator units and the pressure member and positioned to bear against one end of each insulator unit to transmit pressure from the pressure member to said insulator units to urge said electrical resistance element against the surface of said material.

2. In apparatus for severing glass and similar material, a supporting base member for supporting the material to be severed, an elongated electrical resistance element for engagement with a surface of the material to be severed, a plurality of insulator units supporting said electrical resistance element along its length, a pressure member for exerting pressure on said insulator units and spaced therefrom, a pad of resilient material between the insulator units and the pressure member and positioned to bear against one end of each insulator unit to transmit pressure from the pressure member to said insulator units to urge said electrical resistance element against the surface of said material, means for connecting the pressure member to said supporting base member, and means associated with said pressure member for adjusting the pad of resilient material relative to said supporting base member.

3. In apparatus for severing glass and similar material, a base having a surface for supporting material to be severed, an elongated flexible electrical resistance element for engagement with a surface of such material, a plurality of insulators supporting said electrical resistance element along its length, a stem pivoted to each insulator on a pivot axis substantially at right angles to the direction of major extent of the flexible electrical resistance element and substantially parallel with said surface of said base, and means for guiding each stem for movement toward and away from said surface of said base.

4. In apparatus for severing glass and similar material, a base having a surface for supporting material to be severed, an elongated flexible electrical resistance element for engagement with a surface of said material, a plurality of insulator units supporting said flexible resistance element along its length, guide means for the insulator units to guide them for movement toward and away from said surface of the base, means for exerting a pressure upon the insulator units for pressing the resistance element against the material to be severed, and means secured to the last mentioned means for adjusting said guide means in a plane parallel to said surface for changing the curvature of said flexible resistance element to correspondingly vary the curvature of the line of severance of said material.

JOSEPH F. TURKE.